United States Patent
Wang et al.

(10) Patent No.: US 11,501,171 B2
(45) Date of Patent: Nov. 15, 2022

(54) METHOD AND PLATFORM FOR PRE-TRAINED LANGUAGE MODEL AUTOMATIC COMPRESSION BASED ON MULTILEVEL KNOWLEDGE DISTILLATION

(71) Applicant: ZHEJIANG LAB, Hangzhou (CN)

(72) Inventors: Hongsheng Wang, Hangzhou (CN);
Enping Wang, Hangzhou (CN);
Zailiang Yu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 4 days.

(21) Appl. No.: 17/555,535

(22) Filed: Dec. 20, 2021

(65) Prior Publication Data
US 2022/0198276 A1  Jun. 23, 2022

Related U.S. Application Data

(63) Continuation of application No. PCT/CN2020/142577, filed on Dec. 31, 2020.

(51) Int. Cl.
*G06N 3/08* (2006.01)
*G06F 40/40* (2020.01)

(52) U.S. Cl.
CPC ............. *G06N 3/086* (2013.01); *G06F 40/40* (2020.01); *G06N 3/082* (2013.01)

(58) Field of Classification Search
CPC ......... G06N 3/086; G06N 3/082; G06F 40/40
See application file for complete search history.

(56) References Cited

U.S. PATENT DOCUMENTS

| 2020/0302295 A1 | 9/2020 | Tung et al. |
| 2021/0142164 A1* | 5/2021 | Liu .................... G06F 40/30 |

(Continued)

FOREIGN PATENT DOCUMENTS

| CN | 111062489 A | 4/2020 |
| CN | 111506702 A | 8/2020 |

(Continued)

OTHER PUBLICATIONS

International Search Report (PCT/CN2020/142577); dated Aug. 27, 2021.

(Continued)

*Primary Examiner* — Casey R. Garner
(74) *Attorney, Agent, or Firm* — W&G Law Group

(57) ABSTRACT

Disclosed are an automatic compression method and platform for a pre-trained language model based on multilevel knowledge distillation. The method includes the following steps: step 1, constructing multilevel knowledge distillation, and distilling a knowledge structure of a large model at three different levels: a self-attention unit, a hidden layer state and an embedded layer; step 2, training a knowledge distillation network of meta-learning to generate a general compression architecture of a plurality of pre-trained language models; and step 3, searching for an optimal compression structure based on an evolutionary algorithm. Firstly, the knowledge distillation based on meta-learning is studied to generate the general compression architecture of the plurality of pre-trained language models; and secondly, on the basis of a trained meta-learning network, the optimal compression structure is searched for via the evolutionary algorithm, so as to obtain an optimal general compression architecture of the pre-trained language model independent of tasks.

4 Claims, 7 Drawing Sheets

(56) References Cited

U.S. PATENT DOCUMENTS

2021/0357762 A1\* 11/2021 Clement ................ G06N 3/088
2022/0004803 A1\* 1/2022 Li ........................... G06N 3/04

FOREIGN PATENT DOCUMENTS

| CN | 111611377 A | \* | 9/2020 | ........... G06F 16/355 |
| CN | 111767711 A | | 10/2020 | |
| CN | 112016674 A | | 12/2020 | |

OTHER PUBLICATIONS

First Office Action(202011498328.2); dated Jan. 25, 2021.
Model small quick good! MiniLM, Microsoft's universal compression method for Pre-trained Language models(machine translation); Date of Mailing: May 12, 2020.
MINILM: Deep Self-Attention Distillation for Task-Agnostic Compression of Pre-Trained Transformers; Date of Mailing: Feb. 25, 2020.

\* cited by examiner

METHOD AND PLATFORM FOR PRE-TRAINED LANGUAGE MODEL AUTOMATIC COMPRESSION BASED ON MULTILEVEL KNOWLEDGE DISTILLATION

CROSS-REFERENCE TO RELATED APPLICATIONS

The present application is a continuation of International Application No. PCT/CN2020/142577, filed on Dec. 31, 2020, which claims priority to Chinese Application No. 202011498328.2, filed on Dec. 17, 2020, the contents of both of which are incorporated herein by reference in their entireties.

TECHNICAL FIELD

The present invention belongs to the field of language model compression, and particularly relates to a method and platform for a pre-trained language model automatic compression based on multilevel knowledge distillation.

BACKGROUND

A large-scale pre-trained language model has achieved excellent performance in natural language understanding and task generation. However, the deployment of the pre-trained language model with massive parameters into a device with a limited memory still faces a huge challenge. In the field of model compression, the existing language model compression methods are all language model compression for specific tasks. When facing other downstream tasks, a pre-trained model generated by using knowledge distillation of a specific task still needs to perform fine tuning on a large model again and generate related large model knowledge. The fine tuning of the large model is time-consuming and laborious, and the computing cost is also high. In order to improve the flexibility and effectiveness of a compressed model in the use of multiple downstream tasks, a general compression architecture of the pre-trained language model independent of tasks is studied. Moreover, the existing knowledge distillation methods are mainly artificially designed knowledge distillation strategies. Due to the limitation of computing resources and the like, it is almost impossible to artificially design all possible distillation structures and find an optimal structure. Inspired by neural network architecture search, especially in the case of few samples, the present invention generates a general compression architecture of a multitask-oriented pre-trained language model based on multilevel knowledge distillation.

SUMMARY

The purpose of the present invention is to provide a method and platform for a pre-trained language model automatic compression based on multilevel knowledge distillation in view of the deficiencies of the prior art. The present invention firstly constructs a kind of multilevel knowledge distillation, and distills a knowledge structure of a large model at different levels. Moreover, meta-learning is introduced to generate a general compression architecture of a plurality of pre-trained language models. Specifically, a meta-network of a structure generator is designed, a knowledge distillation encoding vector is constructed based on a multilevel knowledge distillation method, and a distillation structure model corresponding to the currently input encoding vector is generated by using the structure generator. At the same time, a Bernoulli distribution sampling method is proposed to train the structure generator. In each round of iteration, a self-attention unit transferred by each encoder is sampled by using Bernoulli distribution to form a corresponding encoding vector. By means of changing the encoding vector and a small batch of training data input into the structure generator, jointly training the structure generator and the corresponding distillation structure, so as to learn a structure generator that can generate weights for different distillation structures. At the same time, on the basis of a trained meta-learning network, an optimal compression structure is searched for via an evolutionary algorithm, so as to obtain an optimal general compression architecture of the pre-trained language model independent of tasks.

The purpose of the present invention is achieved by the following technical solutions:

A method for a pre-trained language model automatic compression based on multilevel knowledge distillation, including the following steps:

Step 1, constructing multilevel knowledge distillation, and distilling a knowledge structure of a large model at three different levels: a self-attention unit, a hidden layer state and an embedded layer;

Step 2, training a knowledge distillation network of meta-learning to generate a general compression architecture of a plurality of pre-trained language models; and Step 3, searching for an optimal compression structure based on an evolutionary algorithm.

Further, in step 2, a meta-network of a structure generator is designed, a knowledge distillation encoding vector is constructed based on the multilevel knowledge distillation in step 1, and a distillation structure model corresponding to the currently input encoding vector is generated by using the structure generator; at the same time, the structure generator is trained by using a Bernoulli distribution sampling method, and in each round of iteration, the self-attention unit transferred by each encoder is sampled by using Bernoulli distribution to form a corresponding encoding vector; and by means of changing the encoding vector and a small batch of training data input into the structure generator, jointly training the structure generator and the corresponding distillation structure, so as to obtain a structure generator that generates weights for different distillation structures.

Further, in step 3, on the basis of a trained meta-learning network, the optimal compression architecture is searched for via the evolutionary algorithm to obtain an optimal general compression architecture of the pre-trained language model independent of tasks.

Further, in step 1, self-attention distribution knowledge, hidden state knowledge and embedded layer knowledge are encoded as a distillation network, and the knowledge distillation is used for compressing the large model into a small model.

Further, step 1 includes self-attention knowledge distillation, hidden layer state knowledge distillation, and embedded layer knowledge distillation.

Further, in step 2, the meta-network of the structure generator is composed of two fully connected layers, a self-attention knowledge distillation encoding vector is input, and a weight matrix of the structure generator is output;

the training process of the structure generator is as follows:

Step 1: constructing the knowledge distillation encoding vector, including a layer sampling vector, a multi-head pruning vector, a hidden layer dimensionality reduction vector and an embedded layer dimensionality reduction vector;

Step 2: constructing a distillation network architecture based on the structure generator, constructing the distillation structure model corresponding to the currently input encoding vector by using the structure generator, and adjusting the shape of the weight matrix output by the structure generator, so that it is consistent with the number of self-attention units that are input and output by the distillation structure corresponding to the self-attention encoding vector; and Step 3: jointly training the structure generator and the distillation structure model: training the structure generator through the Bernoulli distribution sampling method, and by means of changing the self-attention encoding vector and a small batch of training data input into the structure generator, jointly training the structure generator and the corresponding distillation structure, so as to learn a structure generator that can generate weights for different distillation structures.

Further, in step 3, a network encoding vector is input into the trained structure generator to generate the weight of the corresponding distillation network, and the distillation network is evaluated on a verification set to obtain the accuracy of the corresponding distillation network; and the details are as follows:

when certain constraint conditions are met, firstly selecting a series of distillation network encoding vectors as genes of the distillation network, and obtaining the accuracy of the corresponding distillation network by performing evaluation on the verification set; and then, selecting the top k genes with the highest accuracy, generating new genes by using gene recombination and mutation, and performing iteration by further repeating the process of selecting the top k optimal genes and the process of generating the new genes, so as to obtain genes that meet the constraint conditions and have the highest accuracy.

Further, the specific steps of the evolutionary algorithm are as follows:

Step 1, defining the knowledge distillation encoding vector as a gene G of the distillation structure model, and randomly selecting a series of genes that meet a constraint condition C as an initial population;

Step 2, evaluating the inference accuracy of the distillation structure model corresponding to each gene Gi in the existing population on the verification set, and selecting the top k genes with the highest accuracy;

Step 3, performing gene recombination and gene mutation by using the top k genes with the highest accuracy selected in step 2, so as to generate new genes, and adding the new genes into the existing population; and Step 4, repeatedly iterating step 2 and step 3 for N rounds, selecting the top k genes with the highest accuracy in the existing population, and generating new genes, until the genes that meet the constraint condition C and have the highest accuracy are obtained.

A platform for a pre-trained language model automatic compression based on multilevel knowledge distillation, including the following components:

A data loading component configured for acquiring a to-be-compressed training sample, which is uploaded by a logged-in user and contains a BERT model with a specific natural language processing downstream task and a multitask-oriented pre-trained language model, wherein the training sample is a labeled text sample that meets a supervised learning task.

An automatic compression component configured for automatically compressing the multitask-oriented pre-trained language model, and including a knowledge distillation vector encoding module, a distillation network generation module, a joint training module of a structure generator and a distillation network, a distillation network search module and a specific task fine tuning module.

The knowledge distillation vector encoding module includes a layer sampling vector of a Transformer, a multi-head pruning vector of a self-attention unit, a hidden layer dimensionality reduction vector and an embedded layer dimensionality reduction vector, and in a forward propagation process, a distillation network encoding vector is input into the structure generator to generate a distillation network of a corresponding structure and a weight matrix of the structure generator.

The distillation network generation module constructs a distillation network corresponding to the currently input encoding vector based on the structure generator, and adjusts the shape of the weight matrix output by the structure generator, so that it is consistent with the number of self-attention units that are input and output by the distillation structure corresponding to the self-attention encoding vector.

The joint training module of the structure generator and the distillation network trains the structure generator in an end-to-end manner, inputs a multilevel knowledge distillation encoding vector and a small batch of training data into the distillation network, and updates the weight of the distillation structure and the weight matrix of the structure generator.

The distillation network search module uses an evolutionary algorithm to search for a distillation network that meets specific constraint conditions and has the highest accuracy.

The specific task fine tuning module constructs a downstream task network on the pre-trained model distillation network generated by the automatic compression component, performs fine tuning on a downstream task scenario by using a feature layer and an output layer of the distillation network, and outputs a final fine-tuned student model, that is, a compressed model of the pre-trained language model, which includes downstream tasks and is required by the logged-in user, the compressed model is output to a specified container for the logged-in user to download, and comparison information of the size of the model before and after compression is displayed on a page of the output compressed model of the platform.

An inference component: the logged-in user acquires the pre-trained compressed model from the platform, and performs inference on new data of a natural language processing downstream task uploaded by the logged-in user on a data set of an actual scenario by using the compressed model output by the automatic compression component. Further, the comparison information of an inference speed before and after compression is presented on an inference page of the compressed model of the platform.

Further, the logged-in user can directly download the trained pre-trained language model, according to the requirement of the user for a specific natural language processing downstream task, a downstream task network is constructed on the basis of the compressed pre-trained model architecture generated by the platform, is fine tuned and is finally deployed on a terminal device, or inference is directly performed on the natural language processing downstream task on the platform.

The beneficial effects of the present invention are as follows: according to the method and platform for the pre-trained language model automatic compression based on multilevel knowledge distillation of the present invention, firstly, the knowledge distillation based on meta-learning is studied to generate the general compression architecture of the plurality of pre-trained language models; and secondly, on the basis of the trained meta-learning network, the optimal compression structure is searched for via the evolutionary algorithm, so as to obtain the optimal general compression architecture of the pre-trained language model independent of tasks.

According to the platform for the pre-trained language model automatic compression based on multilevel knowledge distillation of the present invention, the general architecture of the multitask-oriented pre-trained language model is generated by compression, the compressed model architecture is made full use to improve the compression efficiency of downstream tasks, and a large-scale natural language processing model can be deployed on end-side devices with small memories and limited resources, which promotes the implementation of general deep language models in the industry.

DESCRIPTION OF EMBODIMENTS

The present invention will be further explained below in conjunction with the drawings.

Figure 1:
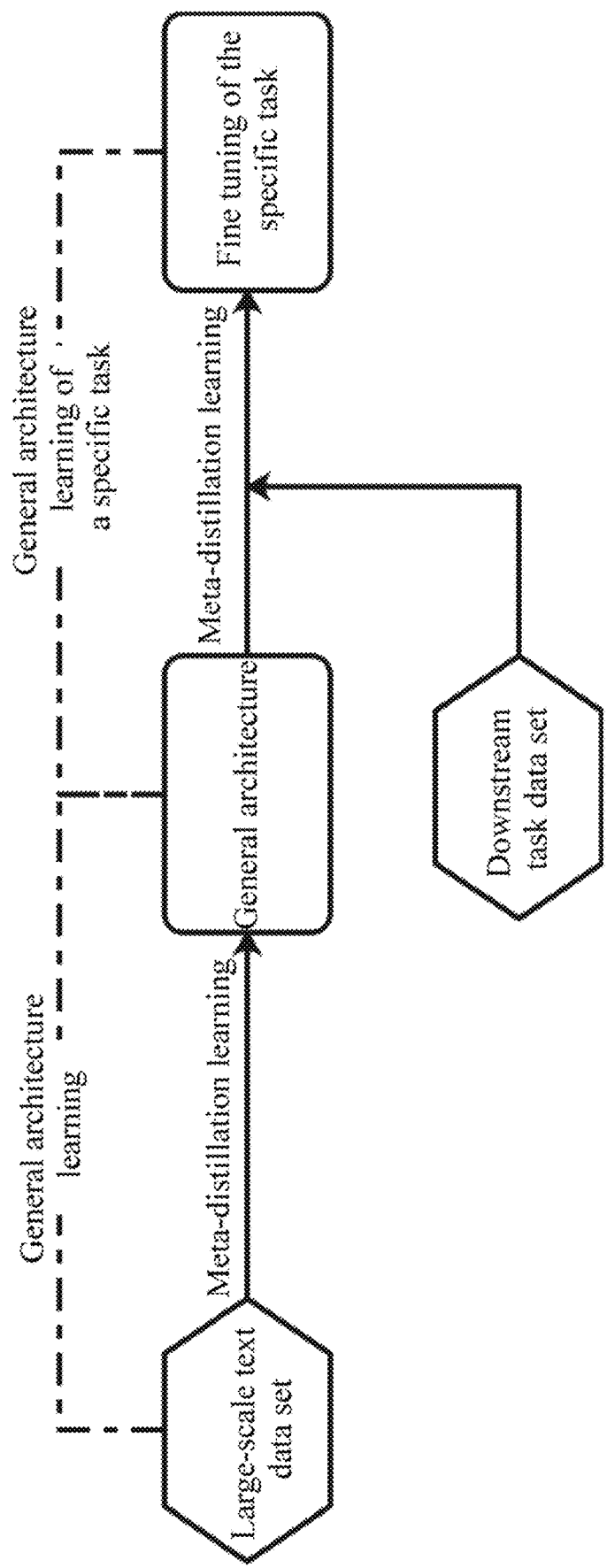
FIG. 1 is an overall architecture diagram of a platform for a pre-trained language model automatic compression based on multilevel knowledge distillation.

As shown in FIG. 1, the present invention includes knowledge distillation based on meta-learning and automatic search of a distillation network based on an evolutionary algorithm. A multitask-oriented large-scale pre-trained language model is automatically compressed to generate a general architecture that meets different hard constraint conditions (such as the number of operations of floating-point number) and is independent of tasks.

The specific solution is as follows: the whole process of a method for a pre-trained language model automatic compression based on multilevel knowledge distillation of the present invention is divided into three stages, the first stage is to construct multilevel knowledge distillation, and to distill a knowledge structure of a large model on three different levels: a self-attention unit, a hidden layer state and an embedded layer; and the second stage is to train a knowledge distillation network of meta-learning to generate a general compression architecture of a plurality of pre-trained language models. Specifically, a meta-network of a structure generator is designed, a knowledge distillation encoding vector is constructed based on the multilevel knowledge distillation method proposed in the first stage, and a distillation structure model corresponding to the currently input encoding vector is generated by using the structure generator. At the same time, a Bernoulli distribution sampling method is proposed to train the structure generator. In each round of iteration, the self-attention unit transferred by each encoder is sampled by using Bernoulli distribution to form a corresponding encoding vector. By means of changing the encoding vector and a small batch of training data input into the structure generator, jointly training the structure generator and the corresponding distillation structure, so as to learn a structure generator that can generate weights for different distillation structures. The third stage is to search for an optimal compression structure based on an evolutionary algorithm. On the basis of a trained meta-learning network, an optimal compression structure is searched for via the evolutionary algorithm, so as to obtain an optimal general compression architecture of the pre-trained language model independent of tasks. The specific process is as follows:

First Stage: Multilevel Knowledge Distillation

Figure 2:
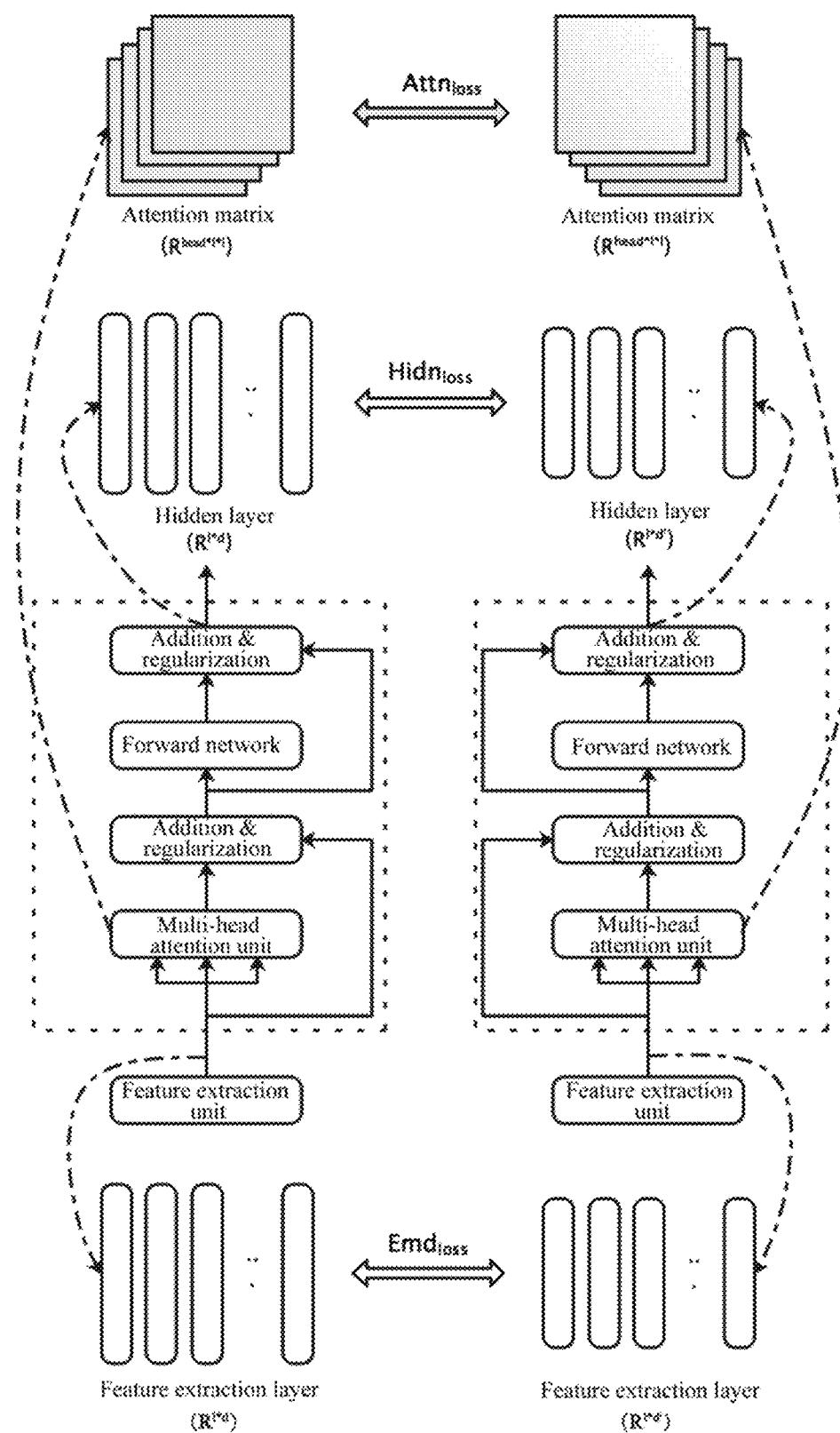
FIG. 2 is a schematic diagram of multilevel knowledge distillation.

In the present invention, self-attention distribution knowledge, hidden state knowledge and embedded layer knowledge are encoded as a distillation network, as shown in FIG. 2. A large model is compressed into a small model by using knowledge distillation, and large-scale self-attention knowledge of the large model is transferred to the small model to the greatest extent.

a. Self-attention knowledge distillation. Transformer layer distillation includes knowledge distillation based on self-attention and knowledge distillation based on hidden layer state, as shown in FIG. 2. The distillation based on self-attention can focus on rich language knowledge. This large amount of language knowledge includes semantic and related information necessary for natural language understanding. Therefore, the knowledge distillation based on self-attention is proposed to encourage the transfer of rich knowledge in a teacher model to a student model.

An attention function is calculated by three matrices of queries, keys and values, which are expressed as a matrix Q, a matrix K and a matrix V respectively. The self-attention function is defined as follows:

$$A = \frac{QK^T}{\sqrt{d_k}}, \quad (1)$$

$$\text{Attention}(Q, K, V) = \text{softmax}(A)V,$$

where $d_k$ represents the dimensionality of the matrix K, which is a scaling factor. A represents a self-attention matrix, which is calculated by the matrix Q and the matrix K via a dot product operation. The final output of the self-attention function Attention(Q, K, V) is used as a weight sum of the matrix V, and the weight is calculated by performing a softmax operation on each column of the matrix V. The self-attention matrix A can focus on a large amount of language knowledge, so the distillation based on self-attention plays an important role in knowledge distillation. Multi-head attention is obtained by splicing attention heads from different feature sub-spaces in the following manner:

$$\text{MultiHead}(Q,K,V)=\text{Concat}(\text{head}_1, \ldots, \text{head}_h)W, \quad (2)$$

where h represents the number of attention heads, $\text{head}_i$ represents the ith attention head, which is calculated by an Attention ( ) function of the different feature sub-spaces, and Concat means splicing, wherein W represents a linear transformation matrix.

The student model learns and imitates the multi-head attention knowledge of a teacher network, wherein a loss function is defined as follows:

$$L_{attn} = \frac{L}{h} \sum_{i=1}^{h} MSE(A_i^S, A_i^T) \quad (3)$$

where h represents the number of attention heads, $A_i \in R^{\square \times \square}$ represents the self-attention matrix corresponding to the ith attention head of the teacher or student model, R represents a real number, 1 represents the input size of the current layer, L represents the length of an input text, and MSE ( ) represents a mean square error Loss function. It is worth noting that the attention matrix $A_i$ is used here instead of the output softmax ($A_i$) of softmax.

b. Hidden layer state knowledge distillation. In addition to the knowledge distillation based on self-attention, the present application is also based on the hidden layer state knowledge distillation, that is, the knowledge output by a Transformer layer is transferred. The loss function of the hidden layer state knowledge distillation is as follows:

$$L_{hidn} = MSE(H^S W_h, H^T), \quad (4)$$

where the matrices $H^S \in R^{L \times d'}$ and $H^T \in R^{L \times d}$ respectively refer to the hidden states of student and teacher networks, scalar values d and d' respectively represent the sizes of the hidden layers of the teacher and student models, the matrix $W_h \in R^{d' \times d}$ is a learnable linear transformation matrix that converts the hidden layer state of the student network into a feature space that is the same as the hidden layer state of the teacher network.

c. Embedded layer knowledge distillation. The present application also uses the knowledge distillation based on the embedded layer, which is similar to the knowledge distillation based on the hidden state, and is defined as:

$$L_{embd} = MSE(E^S W_e, E^T), \quad (5)$$

where the matrices $E^S$ and $E^T$ respectively refer to the embedded layers of the student and teacher networks. In the present application, the shape of an embedded layer matrix is the same as that of a hidden layer state matrix. The matrix $W_e$ is a linear transformation matrix.

Second Stage: Knowledge Distillation of Meta-Learning

Figure 3:
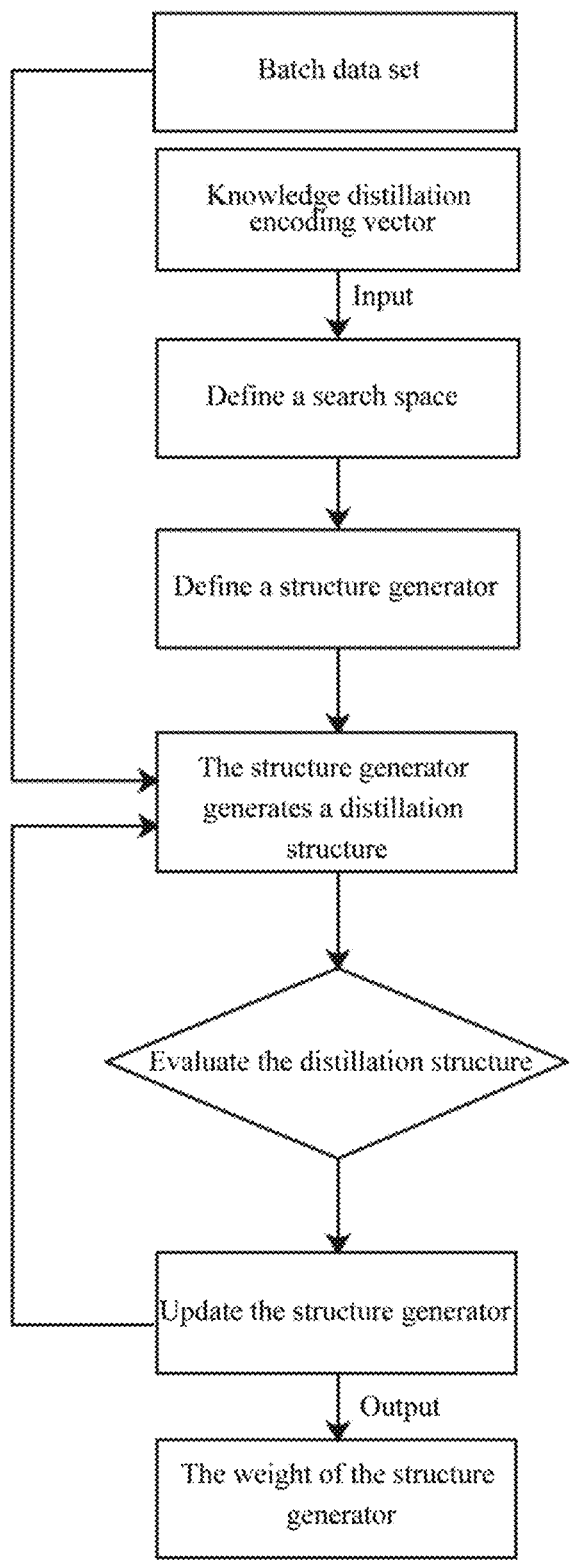
FIG. 3 is a training flow diagram of a structure generator.

A structure generator is designed, and the structure generator is a meta-network, which is composed of two fully connected layers. FIG. 3 shows a training process of the structure generator. A self-attention knowledge distillation encoding vector is input, and a weight matrix of the structure generator is output.

The training process of the structure generator is as follows:

step 1: constructing the knowledge distillation encoding vector. In a forward propagation process, the distillation network encoding vector is input into the structure generator, and the weight matrix of the structure generator is output. The distillation network encoding vector is composed of a layer sampling vector of a Transformer, a multi-head attention pruning vector, a hidden layer dimensionality reduction vector and an embedded layer dimensionality reduction vector. The specific solution of the distillation network encoding vector is as follows:

a. The layer sampling vector. In a layer sampling stage, layer sampling is firstly performed on the number of Transformer layers of BERT by using the Bernoulli distribution, so as to generate a layer sampling vector. Specifically, assuming that the ith Transformer module is currently considered for transfer, Xi is an independent Bernoulli random variable, and the probability of $X_i$ being 1 (or 0) is p (or 1−p).

$$X_i \sim \text{Bernoulli}(p) \quad (6)$$

Bernoulli sampling is performed on 12 Transformer units of the BERT in sequence by using a random variable X, so as to generate a vector consisting of 12 elements 0 or 1. When a probability value of the random variable $X_i$ being 1 is greater than or equal to 0.5, the element corresponding to the layer sampling vector is 1, which means that the current Transformer module performs transfer learning; and when the probability value of the random variable $X_i$ being 1 is less than 0.5, the element corresponding to the layer sampling vector is 0, which means that the current Transformer module does not perform transfer learning.

Layer sampling is performed on all the Transformer layers included in the BERT in sequence by using the above Bernoulli sampling method, so as to form the layer sampling vector in the network encoding vector:

$$\text{layer\_sample} = [0\ 1\ 1\ \ldots\ i\ \ldots\ 1\ 0]\ s.t.\ \text{sum(layer\_sample}[i]==1) \geq 6 \quad (7)$$

It is worth noting that $BERT_{base}$ has a total of 12 Transformer modules. In order to prevent the number (referring to the number of elements being 1 in the layer sampling vector) of transferred Transformer modules during layer sampling from being too small, it is proposed to increase layer sampling constraint conditions, that is, every time a distillation network structure is generated, in the layer sampling stage of all the Transformer layers of the BERT, the constraint conditions are constructed so that the number of elements being 1 in the vector obtained from the final layer sampling is not less than 6, otherwise the layer sampling is performed again.

At this time, when knowledge distillation is performed on the Transformer, a one-to-one mapping relationship between the teacher model and the student model is established through the layer sampling vector in the network encoding vector, and then the corresponding distillation network structure is generated according to the layer sampling vector in the network encoding vector. In order to speed up the entire training process, the Transformer module transferred by the student model is initialized by using the weight of the Transformer whose element corresponding to the layer sampling vector in the teacher model is 1.

b. The multi-head pruning vector. Each Transformer module is composed of a multi-head attention unit. Inspired by channel pruning, the present application proposes multi-head pruning based on the multi-head attention unit. Every time a distillation network structure is generated, a multi-head pruning encoding vector is generated, which represents the number of attention heads that perform self-attention knowledge transfer in all the currently transferred Transformer layers. The formula is defined as follows:

$$\text{head}_{scale} = 0.1 + M_i \times 0.03$$

$$\text{Head}_i = \text{head}_{max} \times \text{head}_{scale}$$

$$M_i = \text{SRS\_Sample}([0,1,2,\ldots,29,30]) \quad (8)$$

where $\text{Head}_i$ represents the number of attention heads contained in each layer of Transformer when the ith distillation network structure is generated. Here, the number of attention heads contained in each layer of Transformer in different distillation network structures generated every time is the same. $\text{head}_{scale}$ represents an attenuation factor for the number of self-attention heads contained in each Transformer module. SRS_Sample represents simple random sampling; since each Transformer module of $BERT_{base}$ has 12 self-attention units, $head_{max}$ is 12. In the process of generating the ith distillation network structure, firstly, simple random sampling is performed on a list [0, 1, 2, . . . , 30] to obtain a random number $M_i$, the attenuation factor $head_{scale}$ of the current distillation structure is obtained, and after multiplying the $head_{scale}$ with a standard $head_{max}$, the number of multi-head attention units of the current distillation network structure is obtained.

Therefore, knowledge distillation is performed based on the attention multi-head pruning, every time a distillation network structure is generated, for the transferred Transformer module, that is, the element whose value is 1 in the Transformer layer sampling encoding vector, a multi-head pruning encoding vector is generated, which represents the number of attention heads that perform self-attention knowledge transfer in all the currently transferred Transformer layers.

c. Hidden layer dimensionality reduction vector. The knowledge distillation based on the hidden layer state is to perform knowledge distillation on the final output of each Transformer layer, that is, to reduce the dimensionality of the BERT hidden layer. The specific process is as follows: the dimensionality of the hidden layers of all the Transformer layers of the distillation network generated every time is the same. The dimensionality $hidn_i$ of the hidden layer that generates the ith distillation network is defined as follows:

$$hidn_{scale}=SRS\_Sample([1,2,3,4,5,6])$$

$$hidn_i=hidn_{base} \times hidn_{scale} \quad (9)$$

where $hidn_{base}$ is a hyperparameter, since the dimensionality of the hidden layer of $BERT_{base}$ is 768, $hidn_{base}$ is initialized to a common divisor of 768, and $hidn_{base}$ is initialized to 128 here. $hidn_{scale}$ represents a dimensionality reduction factor of the dimensionality of the hidden layer, which is an element obtained by performing simple random sampling on the list [1, 2, 3, 4, 5, 6].

Figure 4:
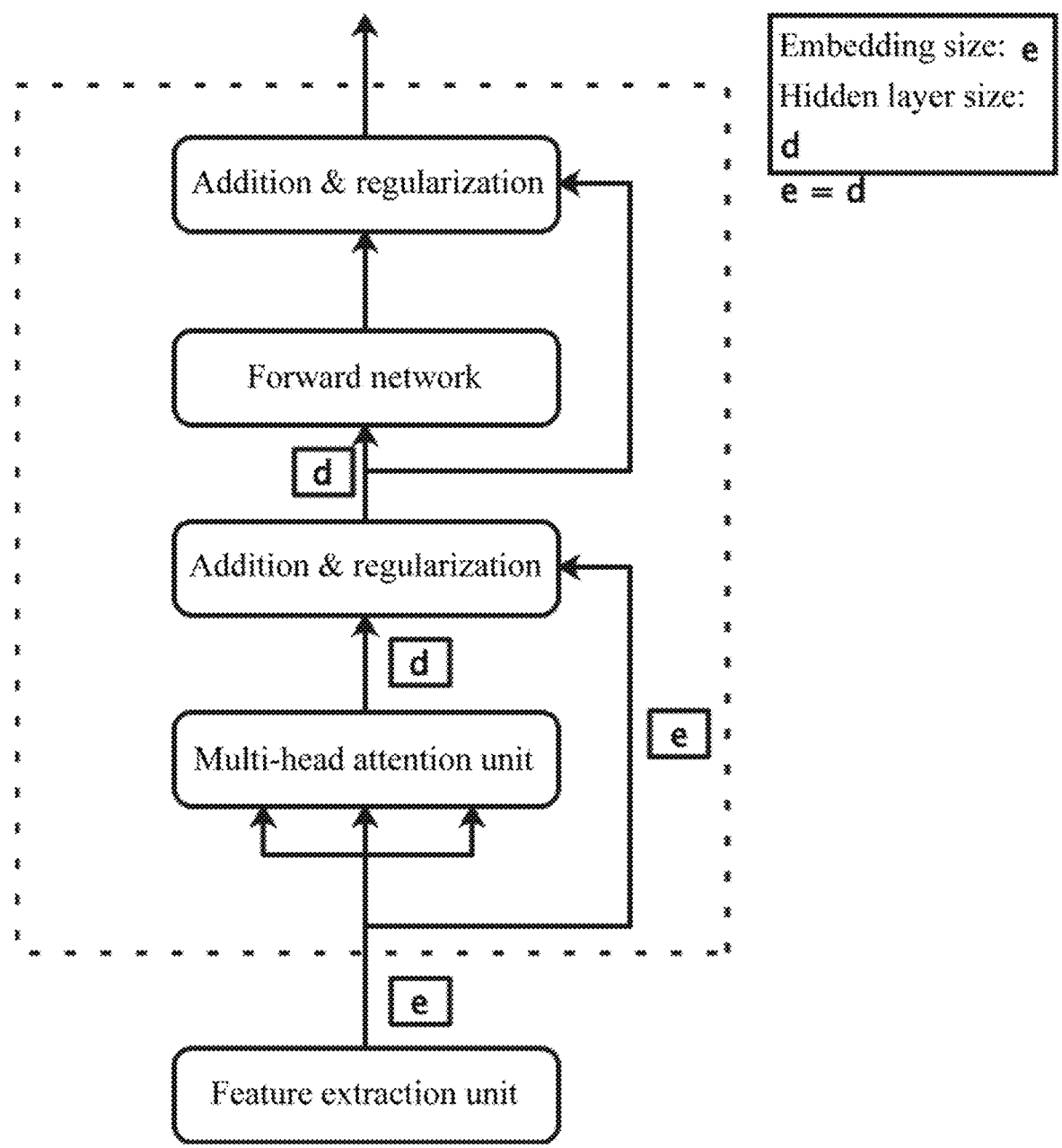
FIG. 4 is a schematic diagram of dimensionality reduction structures of a hidden layer of an encoder module and an input embedded layer.

Therefore, when knowledge distillation is performed based on the hidden layer to generate the distillation network, a dimensionality reduction factor is sampled from the above list every time by using the simple random sampling, so as to generate the dimensionality size of the hidden layer corresponding to the current distillation network.

d. Embedded layer dimensionality reduction vector. FIG. 4 shows dimensionality reduction structures of a hidden layer of an encoder module and an input embedded layer. It can be seen from the figure that, since the hidden layer part and the embedded layer part have a residual connection, the output dimensionality size of the embedded layer is equal to the output dimensionality size of the hidden layer.

Therefore, when knowledge distillation is performed based on the embedded layer to generate the distillation network, the dimensionality size of the embedded layer is kept consistent with the dimensionality size of the current hidden layer every time.

Figure 5:
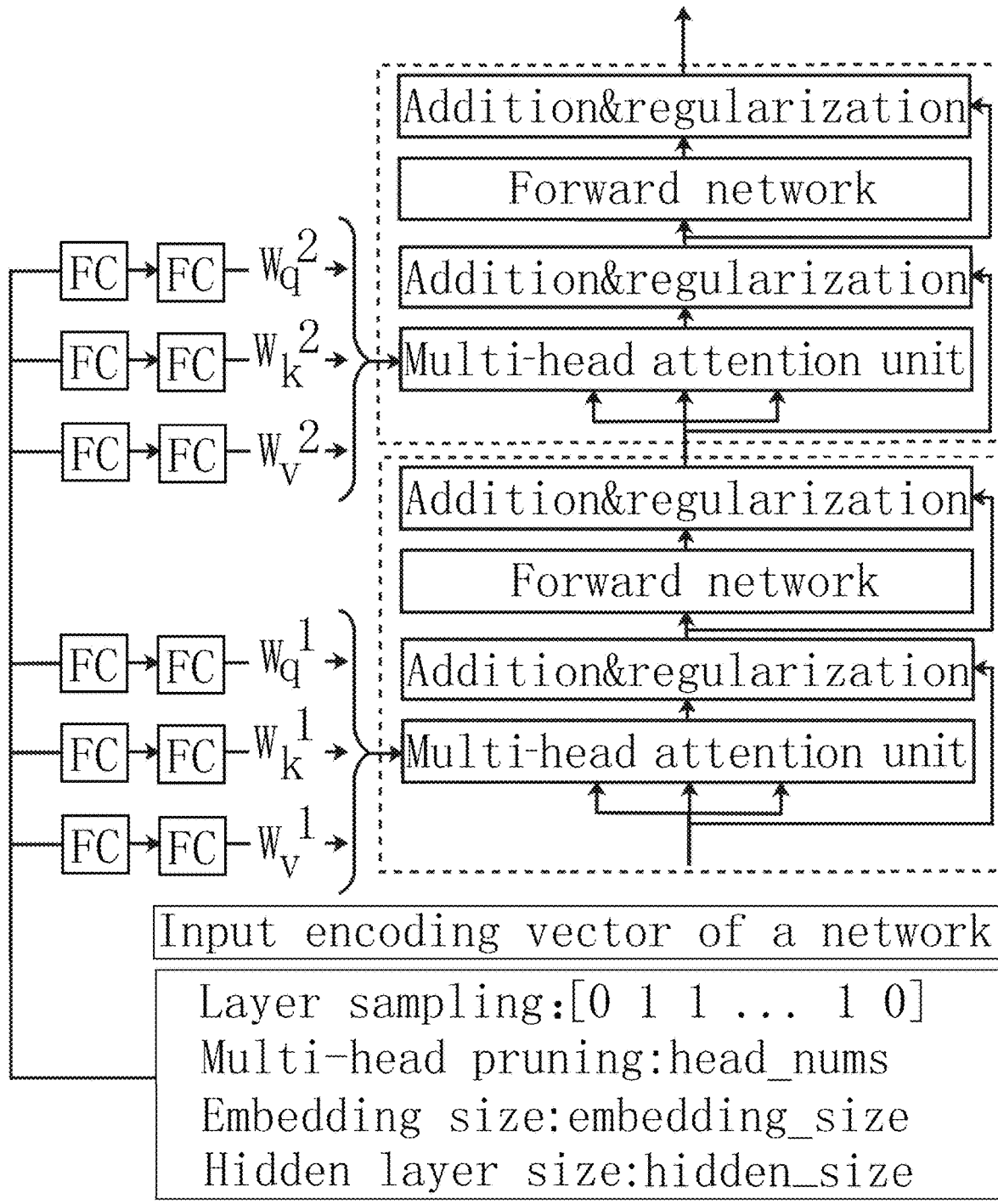
FIG. 5 is an architecture diagram of a distillation network constructed on the basis of the structure generator.

Step 2: constructing a distillation network architecture based on the structure generator. A distillation structure model corresponding to the currently input encoding vector is constructed by using the structure generator, and it is necessary to adjust the shape of the weight matrix output by the structure generator, so that it is consistent with the number of self-attention units that are input and output by the distillation structure corresponding to the self-attention encoding vector. FIG. 5 shows a network architecture of the distillation structure constructed by the structure generator.

Step 3: jointly training the structure generator and the distillation structure model. The self-attention knowledge distillation encoding vector and a small batch of training data are input into the distillation structure model. It is worth noting that, in a back propagation process, the weight of the distillation structure and the weight matrix of the structure generator will be updated together. The weight of the structure generator can be calculated by using a chain rule, so the structure generator can be trained in an end-to-end manner.

Figure 6:
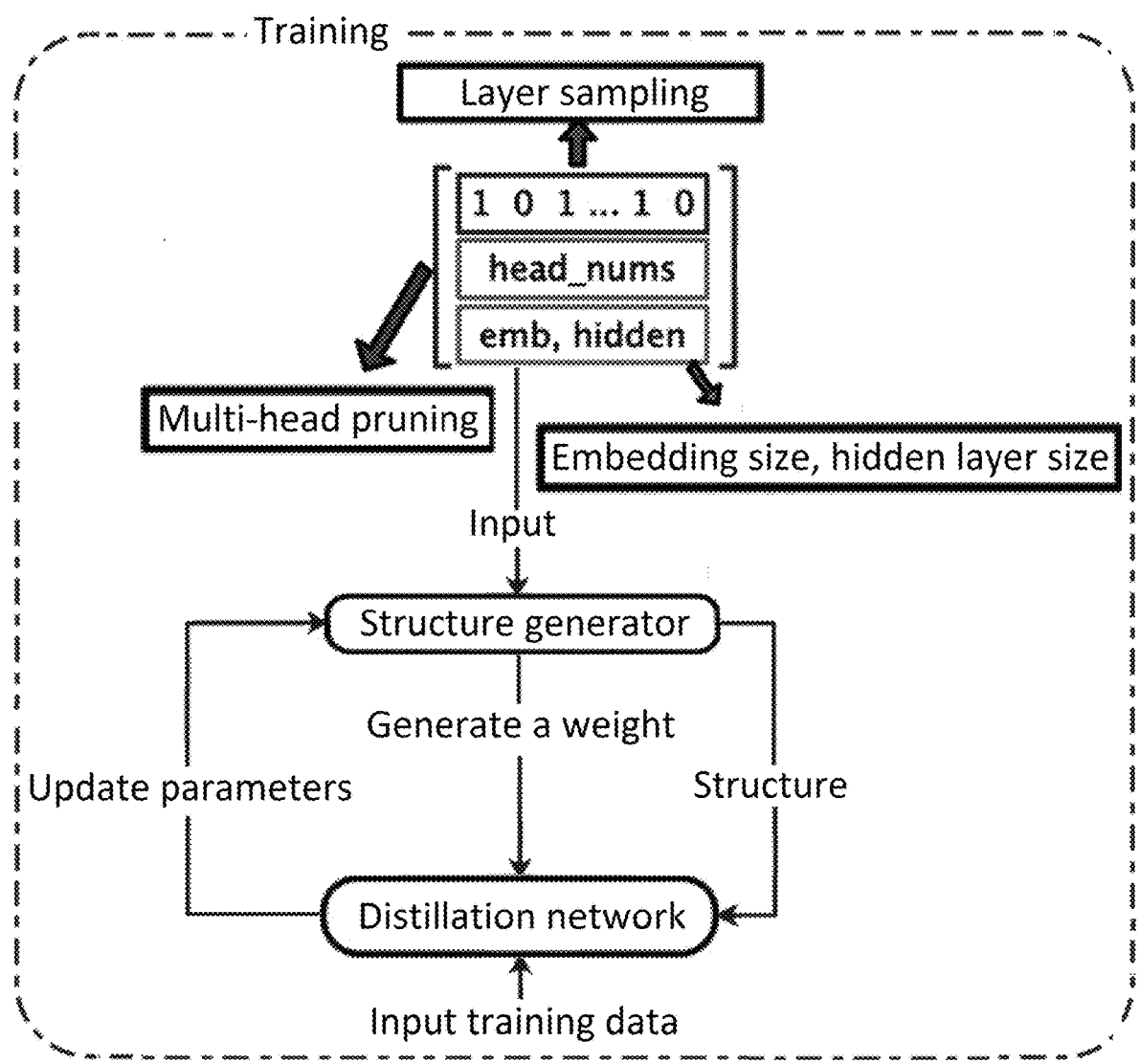
FIG. 6 is a flow diagram of a joint training process of the structure generator and a distillation network.

At the same time, a Bernoulli distribution sampling method is proposed to train the structure generator. In each round of iteration, a self-attention unit transferred by each layer of Transformer is sampled by using Bernoulli distribution to form a corresponding encoding vector. By means of changing the self-attention encoding vector and a small batch of training data input into the structure generator, the structure generator and the corresponding distillation structure are jointly trained, so that a structure generator that can generate weights for different distillation structures can be learned. FIG. 6 shows the training process of the structure generator.

Third Stage: Distillation Network Search Based on the Evolutionary Algorithm

Figure 7:
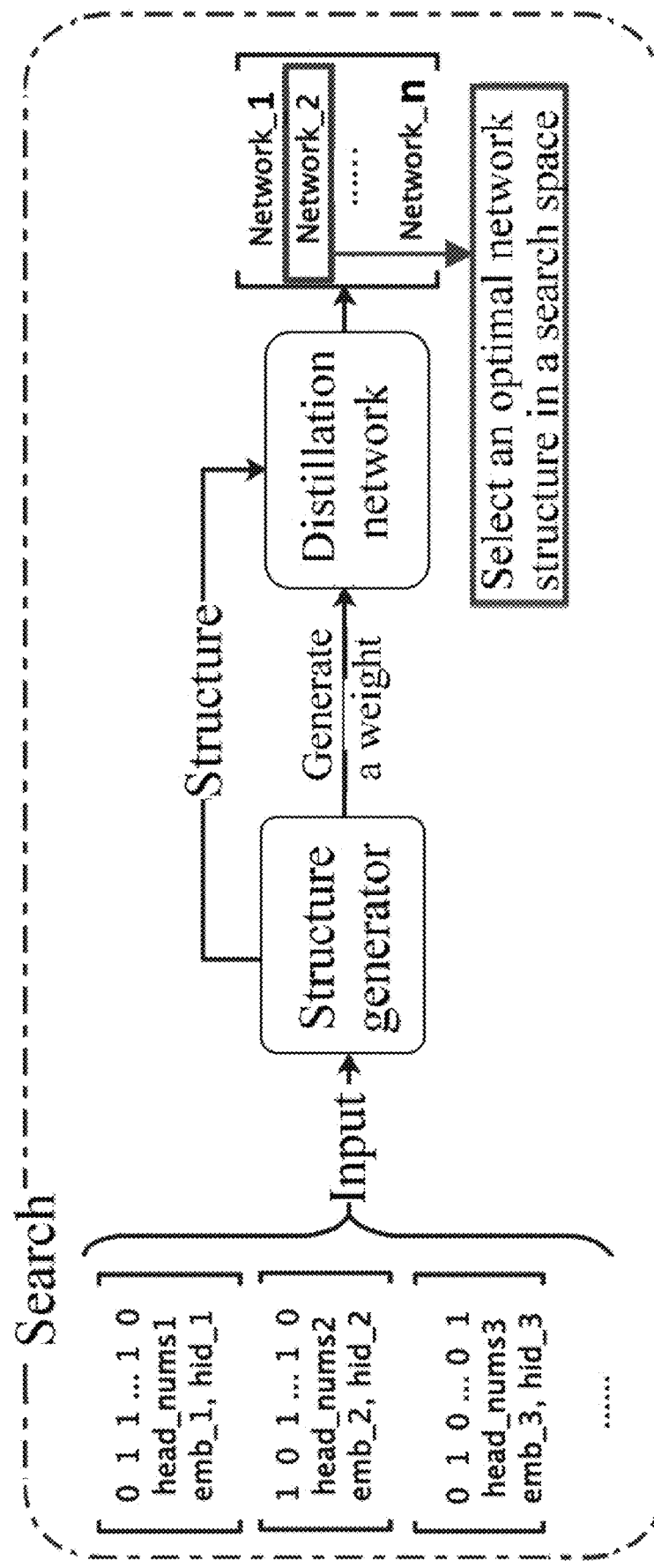
FIG. 7 is a schematic diagram of a distillation network search architecture based on an evolutionary algorithm.

A network encoding vector is input into the trained structure generator to generate the weight of the corresponding distillation network, and the distillation network is evaluated on a verification set to obtain the accuracy of the corresponding distillation network. Then, in order to search for the distillation network that meets specific constraint conditions and has the highest accuracy, it is proposed to use the evolutionary algorithm to search for the distillation network that meets specific constraint conditions and has the highest accuracy. FIG. 7 shows a distillation network search architecture based on the evolutionary algorithm.

In the evolutionary search algorithm used in the meta-learning distillation network, each distillation network is generated by the network encoding vector encoding containing three distillation modules, that is, an embedded layer distillation module, a hidden layer distillation module and a self-attention knowledge distillation module, so the distillation network encoding vector is defined as a gene of the distillation network. When certain constraint conditions are met, firstly, a series of distillation network encoding vectors are selected as the genes of the distillation network, and the accuracy of the corresponding distillation network is obtained by performing evaluation on the verification set. Then, the top k genes with the highest accuracy are selected, and new genes are generated by using gene recombination and mutation. Gene mutation refers to mutation by randomly changing a part of element values in the gene. Gene recombination refers to randomly recombining the genes of two parents to produce offspring. Moreover, it is easy to strengthen the constraints by eliminating unqualified genes. Several rounds of iteration are performed by further repeating the process of selecting the top k optimal genes and the process of generating the new genes, so as to obtain genes that meet the constraint conditions and have the highest accuracy. The third stage: as shown in FIG. 7, it is a process of distillation network search based on the evolutionary algorithm:

On the basis of the knowledge distillation network of meta-learning trained in the second stage, a plurality of knowledge distillation encoding vectors that meet the specific constraint conditions are input into the structure generator to generate corresponding weight matrices, so as to obtain a plurality of distillation structure models; each distillation structure model is evaluated on the verification set to obtain the corresponding accuracy; and the distillation structure model that meets the specific constraint conditions (such as the number of operations of floating-point number) and has the highest accuracy is searched for by using the evolutionary algorithm, so as to obtained a general compression architecture of the pre-trained language model independent of tasks. The specific steps of the evolutionary search algorithm are as follows:

Step 1, since each distillation structure model is generated based on the knowledge distillation encoding vector of Transformer layer sampling, defining the knowledge distillation encoding vector as a gene G of the distillation structure model, and randomly selecting a series of genes that meet a constraint condition C as an initial population.

Step 2, evaluating the inference accuracy of the distillation structure model corresponding to each gene Gi in the existing population on the verification set, and selecting the top k genes with the highest accuracy.

Step 3, performing gene recombination and gene mutation by using the top k genes with the highest accuracy selected in step 2, so as to generate new genes, and adding the new genes into the existing population. Gene mutation refers to mutation by randomly changing a part of element values in the gene; gene recombination refers to randomly recombining the genes of two parents to produce offspring; and moreover, it is easy to strengthen the constraint C by eliminating unqualified genes.

Step 4, repeatedly iterating step 2 and step 3 for N rounds, selecting the top k genes with the highest accuracy in the existing population, and generating new genes, until the genes that meet the constraint condition C and have the highest accuracy are obtained.

A platform for a pre-trained language model automatic compression based on multilevel knowledge distillation of the present invention includes the following components:

A data loading component configured for acquiring a to-be-compressed training sample, which is uploaded by a logged-in user and contains a BERT model with a specific natural language processing downstream task and a multitask-oriented pre-trained language model, wherein the training sample is a labeled text sample that meets a supervised learning task.

An automatic compression component configured for automatically compressing the multitask-oriented pre-trained language model, and including a knowledge distillation vector encoding module, a distillation network generation module, a joint training module of a structure generator and a distillation network, a distillation network search module and a specific task fine tuning module.

The knowledge distillation vector encoding module includes a layer sampling vector of a Transformer, a multi-head pruning vector of a self-attention unit, a hidden layer dimensionality reduction vector and an embedded layer dimensionality reduction vector. In a forward propagation process, a distillation network encoding vector is input into the structure generator to generate a distillation network of a corresponding structure and a weight matrix of the structure generator.

The distillation network generation module constructs a distillation network corresponding to the currently input encoding vector based on the structure generator, and adjusts the shape of the weight matrix output by the structure generator, so that it is consistent with the number of self-attention units that are input and output by the distillation structure corresponding to the self-attention encoding vector.

The joint training module of the structure generator and the distillation network trains the structure generator in an end-to-end manner, specifically inputs a multilevel knowledge distillation encoding vector and a small batch of training data into the distillation network, and updates the weight of the distillation structure and the weight matrix of the structure generator.

In order to search for the distillation network that meets specific constraint conditions and has the highest accuracy, the distillation network search module proposes to use the evolutionary algorithm to search for the distillation network that meets the specific constraint conditions and has the highest accuracy. A network encoding vector is input into the trained structure generator to generate the weight of the corresponding distillation network, and the distillation network is evaluated on a verification set to obtain the accuracy of the corresponding distillation network. In the evolutionary search algorithm used in the meta-learning distillation network, each distillation network is generated by the network encoding vector encoding containing three distillation modules, that is, an embedded layer distillation module, a hidden layer state distillation module and a self-attention knowledge distillation module, so the distillation network encoding vector is defined as a gene of the distillation network. When certain constraint conditions are met, firstly, a series of distillation network encoding vectors are selected as the genes of the distillation network, and the accuracy of the corresponding distillation network is obtained by performing evaluation on the verification set. Then, the top k genes with the highest accuracy are selected, and new genes are generated by using gene recombination and mutation. Iteration is performed by further repeating the process of selecting the top k optimal genes and the process of generating the new genes, so as to obtain genes that meet the constraint conditions and have the highest accuracy.

The specific task fine tuning module constructs a downstream task network on the pre-trained model distillation network generated by the automatic compression component, performs fine tuning on a downstream task scenario by using a feature layer and an output layer of the distillation network, and outputs a final fine-tuned student model, that is, a compressed model of the pre-trained language model, which includes downstream tasks and is required by the logged-in user. The compressed model is output to a specified container for the logged-in user to download, and comparison information of the size of the model before and after compression is displayed on a page of the output compressed model of the platform.

An inference component: the logged-in user acquires the pre-trained compressed model from the platform, and performs inference on new data of a natural language processing downstream task uploaded by the logged-in user on a data set of an actual scenario by using the compressed model output by the automatic compression component. Further, the comparison information of an inference speed before and after compression is presented on an inference page of the compressed model of the platform.

The logged-in user can directly download the trained pre-trained language model provided by the platform of the present invention, according to the requirement of the user for a specific natural language processing downstream task, a downstream task network is constructed on the basis of the compressed pre-trained model architecture generated by the platform, is fine tuned and is finally deployed on a terminal device. Or, inference is directly performed on the natural language processing downstream task on the platform.

The technical solution of the present invention will be further described in detail below by preforming a sentiment classification task on movie reviews.

A BERT model and a sentiment analysis data set SST-2 of a text classification task of a single sentence uploaded by the logged-in user are acquired via the data loading component of the platform.

A multitask-oriented BERT pre-trained language model is generated via the automatic compression component of the platform.

The BERT pre-trained model generated by the automatic compression component is loaded via the platform, and a model of the text classification task is constructed on the generated pre-trained model.

Fine tuning is performed on a student model based on the specific task fine tuning module of the automatic compression component, fine tuning is performed on a downstream text classification task scenario by using the feature layer and the output layer of the BERT pre-trained model generated by the automatic compression component, and finally, the platform outputs a compressed model of the BERT model that is required by the logged-in user and contains the text classification task.

The compressed model is output to a specified container for the logged-in user to download, and comparison information of the size of the model before and after compression is displayed on the page of the output compressed model of the platform, the size of the model before compression is 110M, and the size of the model after compression is 53M, which is compressed by 51.8%. As shown in Table 1 below.

TABLE 1

Comparison information of the BERT model of the text classification task before and after compression

| Text classification task (SST-2) (including 67K samples) | Before compression | After compression | Comparison |
|---|---|---|---|
| Size of the model | 110M | 53M | Compressed by 51.8% |
| Inference accuracy | 91.5% | 92.3% | Increased by 0.8% |

Through the inference component of the platform, the compressed model output by the platform is used for inferring the SST-2 test set data uploaded by the logged-in user, and it is represented on the inference page of the compressed model of the platform that, the inference speed after compression is 1.95 times faster than that before compression, and that the inference accuracy is increased from 91.5% before compression to 92.3%.

What is claimed is:

1. A method for a pre-trained language model automatic compression based on multilevel knowledge distillation, comprising the following steps:
    step 1, constructing multilevel knowledge distillation, and distilling a knowledge structure of a large model at three different levels: a self-attention unit, a hidden layer state and an embedded layer;
    step 2, training a knowledge distillation network of meta-learning to generate a general compression architecture of a plurality of pre-trained language models;
    wherein in step 2, training a knowledge distillation network of meta-learning comprise: a meta-network of a structure generator is designed, a knowledge distillation encoding vector is constructed based on the multilevel knowledge distillation in step 1, and a distillation structure model corresponding to the currently input encoding vector is generated by using the structure generator; at the same time, the structure generator is trained by using a Bernoulli distribution sampling method, and in each round of iteration, the self-attention unit transferred by each encoder is sampled by using Bernoulli distribution to form a corresponding encoding vector; and by means of changing the encoding vector and a small batch of training data input into the structure generator, jointly training the structure generator and the corresponding distillation structure, so as to obtain a structure generator that generates weights for different distillation structures; and
    step 3, searching for an optimal compression structure based on an evolutionary algorithm;
    wherein the specific steps of the evolutionary algorithm are as follows:
    step 1, defining the knowledge distillation encoding vector as a gene G of the distillation structure model, and randomly selecting a series of genes that meet a constraint condition C as an initial population;
    step 2, evaluating the inference accuracy of the distillation structure model corresponding to each gene Gi in the existing population on the verification set, and selecting the top k genes with the highest accuracy;
    step 3, performing gene recombination and gene mutation by using the top k genes with the highest accuracy selected in step 2, so as to generate new genes, and adding the new genes into the existing population; and
    step 4, repeatedly iterating step 2 and step 3 for N rounds, selecting the top k genes with the highest accuracy in the existing population, and generating new genes, until the genes that meet the constraint condition C and have the highest accuracy are obtained.

2. The method for the pre-trained language model automatic compression based on multilevel knowledge distillation according to claim 1, wherein in step 3, on the basis of a trained meta-learning network, the optimal compression architecture is searched for via the evolutionary algorithm to obtain an optimal general compression architecture of the pre-trained language model independent of tasks.

3. The method for the pre-trained language model automatic compression based on multilevel knowledge distillation according to claim 1, wherein
    in step 1, self-attention distribution knowledge, hidden state knowledge and embedded layer knowledge are encoded as a distillation network, and the knowledge distillation is used for compressing the large model into a small model.

4. The method for the pre-trained language model automatic compression based on multilevel knowledge distillation according to claim 3, wherein
    step 1 comprises self-attention knowledge distillation, hidden layer state knowledge distillation, and embedded layer knowledge distillation.

* * * * *